(12) United States Patent
Conway

(10) Patent No.: US 9,944,843 B2
(45) Date of Patent: Apr. 17, 2018

(54) STIMULATION OF WELLS IN NANO-DARCY SHALE FORMATIONS

(71) Applicant: Flex-Chem Holding Company, LLC, Weatherford, OK (US)

(72) Inventor: Andrew Bryce Conway, Weatherford, OK (US)

(73) Assignee: Flex-Chem Holding Company, LLC, Weatherford, OK (US)

( * ) Notice: Subject to any disclaimer, the term of this patent is extended or adjusted under 35 U.S.C. 154(b) by 252 days.

(21) Appl. No.: 14/686,237

(22) Filed: Apr. 14, 2015

(65) Prior Publication Data

US 2015/0292308 A1 Oct. 15, 2015

Related U.S. Application Data

(60) Provisional application No. 61/979,210, filed on Apr. 14, 2014, provisional application No. 62/087,899, filed on Dec. 5, 2014.

(51) Int. Cl.
*E21B 43/16* (2006.01)
*E21B 43/25* (2006.01)
(Continued)

(52) U.S. Cl.
CPC .............. *C09K 8/605* (2013.01); *C09K 8/528* (2013.01); *C09K 8/602* (2013.01); *C09K 8/62* (2013.01);
(Continued)

(58) Field of Classification Search
CPC .................................. E21B 43/16; E21B 43/25
See application file for complete search history.

(56) References Cited

U.S. PATENT DOCUMENTS 3,700,280 A 10/1972 Papadopolous et al.
4,089,787 A 5/1978 Lybarger et al.
(Continued)

FOREIGN PATENT DOCUMENTS

EP 0326720 A1 8/1989
EP 0505169 A1 9/1992
(Continued)

OTHER PUBLICATIONS

International Search Report for Application No. PCT/US2015/25399 dated Jul. 8, 2015, 2pgs.
(Continued)

*Primary Examiner* — Catherine Loikith
(74) *Attorney, Agent, or Firm* — Merchant & Gould P.C.

(57) ABSTRACT

Formulations and methods for stimulating the production from wells in nano-darcy shale formations. In one embodiment, the method includes injecting a treatment mixture containing a metal complexing agent into a nano-darcy shale formation adjacent to a well at a pressure below the fracture pressure of the formation. A sufficient contact time is allowed and then the treatment mixture is pumped from the subsurface. This has been shown to stimulate well production in shale formations. Without being held to a particular theory it appears that the metal complexing agent is binding with naturally occurring metals in the shale formation, and particularly divalent metal ions, which are then extracted with the spent fluid. This removal of naturally occurring metals may be increasing the permeability of the formation in the contact region adjacent to the well, thereby causing the observed increased production.

13 Claims, 5 Drawing Sheets

(51) Int. Cl.
- *C09K 8/60* (2006.01)
- *C09K 8/528* (2006.01)
- *E21B 43/267* (2006.01)
- *C09K 8/62* (2006.01)
- *C09K 8/72* (2006.01)

(52) U.S. Cl.
CPC ............ *E21B 43/267* (2013.01); *C09K 8/72* (2013.01); *C09K 2208/32* (2013.01)

(56) References Cited

U.S. PATENT DOCUMENTS

| | | |
|---|---|---|
| 4,815,537 A | 3/1989 | Jones |
| 4,986,356 A | 1/1991 | Lockhardt et al. |
| 5,223,159 A | 6/1993 | Smith et al. |
| 5,224,546 A | 7/1993 | Smith et al. |
| 5,346,010 A | 9/1994 | Adams et al. |
| 5,497,830 A | 3/1996 | Boles |
| 5,678,632 A | 10/1997 | Moses et al. |
| 5,944,446 A | 8/1999 | Hocking |
| 6,110,875 A | 8/2000 | Tjon-Joe-Pin |
| 6,162,766 A | 12/2000 | Muir |
| 6,225,262 B1 | 5/2001 | Irwin |
| 6,265,355 B1 | 7/2001 | Lai et al. |
| 6,331,513 B1 | 12/2001 | Zaid et al. |
| 6,435,277 B1 | 8/2002 | Qu et al. |
| 6,436,880 B1 | 8/2002 | Frenier |
| 6,527,051 B1 | 3/2003 | Reddy et al. |
| 6,569,814 B1 | 5/2003 | Brady et al. |
| 6,638,896 B1 | 10/2003 | Tibbles et al. |
| 7,013,974 B2 | 3/2006 | Hanes, Jr. |
| 7,159,658 B2 | 1/2007 | Frost et al. |
| 7,192,908 B2 | 3/2007 | Frenier et al. |
| 7,208,529 B2 | 4/2007 | Crews |
| 7,306,041 B2 | 12/2007 | Milne et al. |
| 7,527,103 B2 | 5/2009 | Huang et al. |
| 7,906,463 B2 | 3/2011 | Starkey, II et al. |
| 7,928,040 B2 | 4/2011 | Sanders et al. |
| 8,071,511 B2 | 12/2011 | Welton et al. |
| 8,236,734 B1 | 8/2012 | Shen et al. |
| 8,312,929 B2 | 11/2012 | Frenier et al. |
| 8,567,503 B2 | 10/2013 | Welton et al. |
| 8,567,504 B2 | 10/2013 | Welton et al. |
| 8,584,757 B2 | 11/2013 | Reyes |
| 2002/0160920 A1 | 10/2002 | Dawson et al. |
| 2005/0150520 A1 | 7/2005 | Gill et al. |
| 2006/0124302 A1 | 6/2006 | Gupta et al. |
| 2006/0142166 A1 | 6/2006 | Thomas |
| 2008/0110621 A1 | 5/2008 | Montgomery et al. |
| 2009/0298721 A1 | 12/2009 | Robb et al. |
| 2010/0276152 A1 | 11/2010 | De Wolf et al. |
| 2010/0294498 A1 | 11/2010 | Svoboda et al. |
| 2011/0053811 A1 | 3/2011 | Horton et al. |
| 2011/0214862 A1 | 9/2011 | Horton |
| 2011/0237470 A1 | 9/2011 | Li et al. |
| 2011/0263466 A1 | 10/2011 | Rose |
| 2012/0125626 A1 | 5/2012 | Constantine |
| 2013/0157905 A1 | 6/2013 | Saini et al. |
| 2013/0210684 A1 | 8/2013 | Ballard |
| 2013/0213657 A1 | 8/2013 | Dobson, Jr. et al. |
| 2013/0261032 A1 | 10/2013 | Ladva et al. |
| 2013/0269936 A1 | 10/2013 | Reyes et al. |
| 2013/0269941 A1 | 10/2013 | Reyes et al. |
| 2013/0269944 A1 | 10/2013 | Reyes et al. |
| 2013/0274154 A1 | 10/2013 | Nasr-El-Din et al. |
| 2013/0274155 A1 | 10/2013 | Nasr-El-Din et al. |
| 2013/0303412 A1 | 11/2013 | Luyster et al. |
| 2014/0116696 A1 | 5/2014 | Reyes |
| 2014/0124205 A1 | 5/2014 | Nasr-El-Din et al. |
| 2014/0151042 A1 | 6/2014 | Faugerstrom et al. |
| 2015/0005204 A1 | 1/2015 | Alwattari et al. |
| 2015/0114653 A1* | 4/2015 | Conway ............ C09K 8/52 166/308.2 |
| 2016/0067845 A1 | 3/2016 | Conway |

FOREIGN PATENT DOCUMENTS

| | | |
|---|---|---|
| EP | 0599474 A2 | 6/1994 |
| WO | 2009086954 A1 | 7/2009 |
| WO | 2009091652 A2 | 7/2009 |
| WO | 2012116032 A1 | 8/2012 |
| WO | 2012171857 A1 | 12/2012 |
| WO | 2013019188 | 2/2013 |
| WO | 2013081609 A1 | 6/2013 |
| WO | 2013173634 A1 | 11/2013 |

OTHER PUBLICATIONS

Written Opinion of the International Searching Authority for Application No. PCT/US2015/25399 dated Jul. 8, 2015, 5pgs.

Notification of Transmittal of the International Search Report and the Written Opinion of the International Searching Authority, or the Declaration for Application No. PCT/US2015/25399 dated Jul. 8, 2015, 1pg.

Frenier, et al., Use of Highly Acid-Soluble Chelating Agents in Well Stimulation Services, SPE Annual Technical Conference and Exhibition, Oct. 1-4, 2000, Dallas, Texas, https://www.onepetro.org/conference-paper/SPE-63242-MS.

EPA, Proceedings of the Technical Workshops for the Hydraulic Fracturing Study: Chemical & Analytical Methods, EPA 600/R-11/066, May 2011, 122pgs.

Al-Harthy, et al., Options for High-Temperature Well Stimulation, Oilfield Review, Winter 2008/2009: 20, No. 4., 11pgs.

Xu, et al., On Modeling of Chemical Stimulation of an Enhanced Geothermal System using a High pH Solution with Chelating Agent, Aug. 2009, 30pgs.

Portier, et al., CREGE, Review on chemical stimulation techniques in oil industry and applications to geothermal systems, May 2007, 34pgs.

Nasir, Effects of Acid Additives on Spent Acid Flowback Through Carbonate Cores, May 2012, 125pgs.

Weidner, Chemical Additive Selection in Matrix Acidizing, May 2011, 95pgs.

Civan, et al., Rigorous Modeling of Gas Transport in Nano-darty Shale Porous Media under Extreme Pore Proximity and Elevated Pressure Conditions, Proceedings of the International Conference on Heat Transfer and Fluid Flow, Paper No. 208, Aug. 2014, 2pgs.

BWA, Geogard(R) SX—Amorphous Silica Control, Product Information, 2013, 2pgs.

Nguyen, Well Design Spring 2013 Power Point, 44pgs.

Caputo, Shale Plays: Basic Geologic and Engineering Concepts, AAPL's 57th Annual Meeting, Boston Jun. 2011, 71pgs.

Notification of Transmittal of the International Search Report and the Written Opinion of the International Searching Authority, or the Declaration, PCT/US2014/062440, dated Feb. 13, 2015, 1 pg.

International Search Report, PCT/US2014/062440, dated Feb. 13, 2015, 2pgs.

Written Opinion of the International Searching Authority, PCT/US2014/062440, dated Feb. 13, 2015, 6pgs.

European Search Report for European Patent Application No. 14856530.2-1354, dated Jun. 23, 2017, 8pgs.

Written Opinion, PCT/US2015/048634 dated Dec. 7, 2015, 5pgs.

International Search Report, PCT/US2015/048634 dated Dec. 7, 2015, 2pgs.

Geiver, The Slickwater Story, The Bakken magazine, http://thebakken.com/articles/711/the-slickwater-story, Jul. 14, 2014, 2pgs.

Huang R.Y.M.; Jarvis, N.R. 1973. Ionically crosslinked hydrophilic polymer membranes: Synthesis and measurement of transport properties, J Polym Sci 41: 117-127, 11 pgs.

Ahmed, E.M. 2015. Hydrogel: Preparation, characterization, and applications: A review, J Adv Res 6: 105-121, 17pgs.

Akin, H.; Hasirci, V.N.; Hasirci, N. 1990. Permeability properties of charged hydrogel-carrying membranes, Polymer 31 (2): 270-275, 6pgs.

Rick McCurdy, High Rate Hydraulic Fracturing Additives in Non-Marcellus Unconventional Shales, May 2011, pp. 17-21, Proceedings of the Technical Workshops for the Hydraulic Fracturing Study: Chemical & Analytical Methods http://water.epa.gov/type/ground-

(56) References Cited

OTHER PUBLICATIONS water/uic/class2/hydraulicfracturing/upload/proceedingsofhfchemanalmethodsfinalmay2011.pdf.
European Search Report dated Aug. 31, 2017, Application No. EP15780712.4, 7pgs.
Australian Examination Report, Application No. 2015247994, dated Feb. 8, 2018, 3pgs.

* cited by examiner

STIMULATION OF WELLS IN NANO-DARCY SHALE FORMATIONS

RELATED APPLICATIONS

This application claims the benefit of U.S. Provisional Application No. 62/087,899, filed Dec. 5, 2014, and U.S. Provisional Application No. 61/979,210, filed Apr. 14, 2014, which applications are hereby incorporated by reference.

INTRODUCTION

The darcy is a unit of permeability for fluids in a porous material. Nano-darcy shale formations refer to those shale formations having an average permeability in at least one direction of less than 1 micro-darcy or less than $1 \times 10^{-6}$ darcy. In nano-darcy shale formations, the range of average pore sizes within the shale spans the size of the hydrocarbons trapped in the shale, e.g., the natural gas molecules and the molecules of the various crude oil constituents. That is, the average pore size within the shale may be smaller, approximately the same size or larger than the size of the hydrocarbons. This differs from higher permeability shale formations in which the average pores sizes are substantially larger than the various hydrocarbon molecule sizes.

While permeability is a useful measurement, the determination of average pore size from a permeability measurement relies on assumptions about the shapes of the grains or pores in the subsurface. Shale formations are a mixture of clay minerals and larger particles. Clay minerals are not normally spherically shaped and also exhibit electro-static properties not found in non-clay materials. Thus, as nano-darcy shale formations are typically very high in clay content, they do not exhibit the same behaviors as more permeable formations, even more permeable shale formations.

Well stimulation refers to the treatment of an existing well to increase its recovery of hydrocarbons or other substances from the subsurface. Because of the different nature of nano-darcy shale formations, typical well stimulation techniques have been found to be ineffective or much less effective than in higher permeability formations.

An extreme form of well stimulation is referred to as hydraulic fracturing. Hydraulic fracturing of oil and gas wells is conducted by pumping fluids at high pressures and high velocities through a vertical and, usually, a horizontal section of a well. The well contains a well casing and, in some wells, tubing inside the casing. Perforations or ports in the casing are adjacent to targeted intervals of subterranean formations containing a hydrocarbon or target product. In hydraulic fracturing, the pressure exerted on the formation is greater than the pressure required to substantially fracture the formation, a pressure referred to as the fracture pressure of the formation which is a function of the formation' properties and the depth where the fractures are desired. One test for determining the fracture pressure is the Leak-off test. Applying a pressure equal to or greater than the fracture pressure causes the formation to fracture, creating an extensive fracture network.

After the fractures or cracks are initiated, pumping is continued, allowing the fractures to propagate. Once the fracture has gained sufficient fracture width, a proppant such as sand is added to the fluid and is transported into the fracture system, partially filling the fracture network. After the desired amount of proppant is placed in the fractures, additional water-based fluid is pumped to flush the casing of any proppant that may have settled in the casing. On completion of the fracturing process, the well is opened, allowing a portion of the fracturing fluids to be recovered. As the pressure is relieved, the fracture closes onto the proppant, creating a conductive pathway needed to accelerate oil and gas recovery from the formation. Hydraulic fracturing is expensive because of the large amounts of fluids and high pressures involved.

Stimulation of Wells in Nano-Darcy Shale Formations

This disclosure describes formulations and methods for stimulating the production from wells in nano-darcy shale formations. In one embodiment, the method includes injecting a treatment mixture containing a metal complexing agent such as citric acid or EDTA into a shale formation adjacent to a well at a pressure below the fracture pressure of the formation. A sufficient contact time is allowed and then the treatment mixture is pumped from the subsurface. This has been shown to stimulate well production in nano-darcy shale formations. In another embodiment, the method includes staging the treatment mixture containing a metal complexing agent such as citric acid or EDTA in combination with hydraulic fracturing and injecting into the formation in conjunction with propagation of the induced fractures. Without being held to a particular theory, based on an analysis of the extracted spent treatment fluid it appears that the metal complexing agent binds with naturally occurring metals in the formation, and particularly divalent and/or trivalent metal ions, which are then extracted with the spent treatment mixture. This removal of naturally occurring metals may be increasing the permeability of the formation in the contact region adjacent to the well, thereby causing the increased production.

In one aspect, this disclosure describes a method for stimulating a well in a nano-darcy shale formation. The method includes providing a treatment mixture containing between about 0.1% and 95% by weight metal complexing agent at a pH of between about 0 and 10; injecting the treatment mixture into the well at a pressure less than a fracture pressure of the nano-darcy shale formation until at least some of the treatment mixture contacts the nano-darcy shale formation; maintaining the treatment mixture in contact with the nano-darcy shale formation for a contact time of between about 1 minute to 100 days, thereby allowing the metal complexing agent to bind with at least some naturally-occurring metals contained within the nano-darcy shale formation; and removing the treatment mixture from the well after the contact time, thereby removing the bound naturally-occurring metals from the non-darcy shale formation and thereby improving the hydrocarbon production of the well relative to the hydrocarbon production immediately prior to performance of the method. In the method, the metal complexing agent may be one or more of citric acid, ethylene diaminet etra acetic acid (EDTA), acetic acid, or any of a number of compounds described below.

Another aspect of this disclosure is method for fracturing and stimulating a well in a nano-darcy shale formation. The method includes providing a treatment mixture containing between about 0.1% and 95% by weight metal complexing agent at a pH of between about 0 and 10; injecting the treatment mixture into the well at a pressure greater than a fracture pressure of the nano-darcy shale formation until at least some of the treatment mixture enters fractures in the nano-darcy shale formation, thereby allowing the metal complexing agent to bind with at least some naturally-occurring metals contained within the nano-darcy shale formation; and removing spent treatment mixture and fracturing fluids from the well after the fractures are created, thereby removing the bound naturally-occurring metals from the non-darcy shale formation. The injecting operation may be part of a fracturing operation that causes the fractures to occur in the nano-darcy shale formation. The method may further include fracturing the nano-darcy shale formation; and wherein the injecting operation occurs after the fracturing operation causes the fractures to occur in the nano-darcy shale formation.

These and various other features as well as advantages which characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
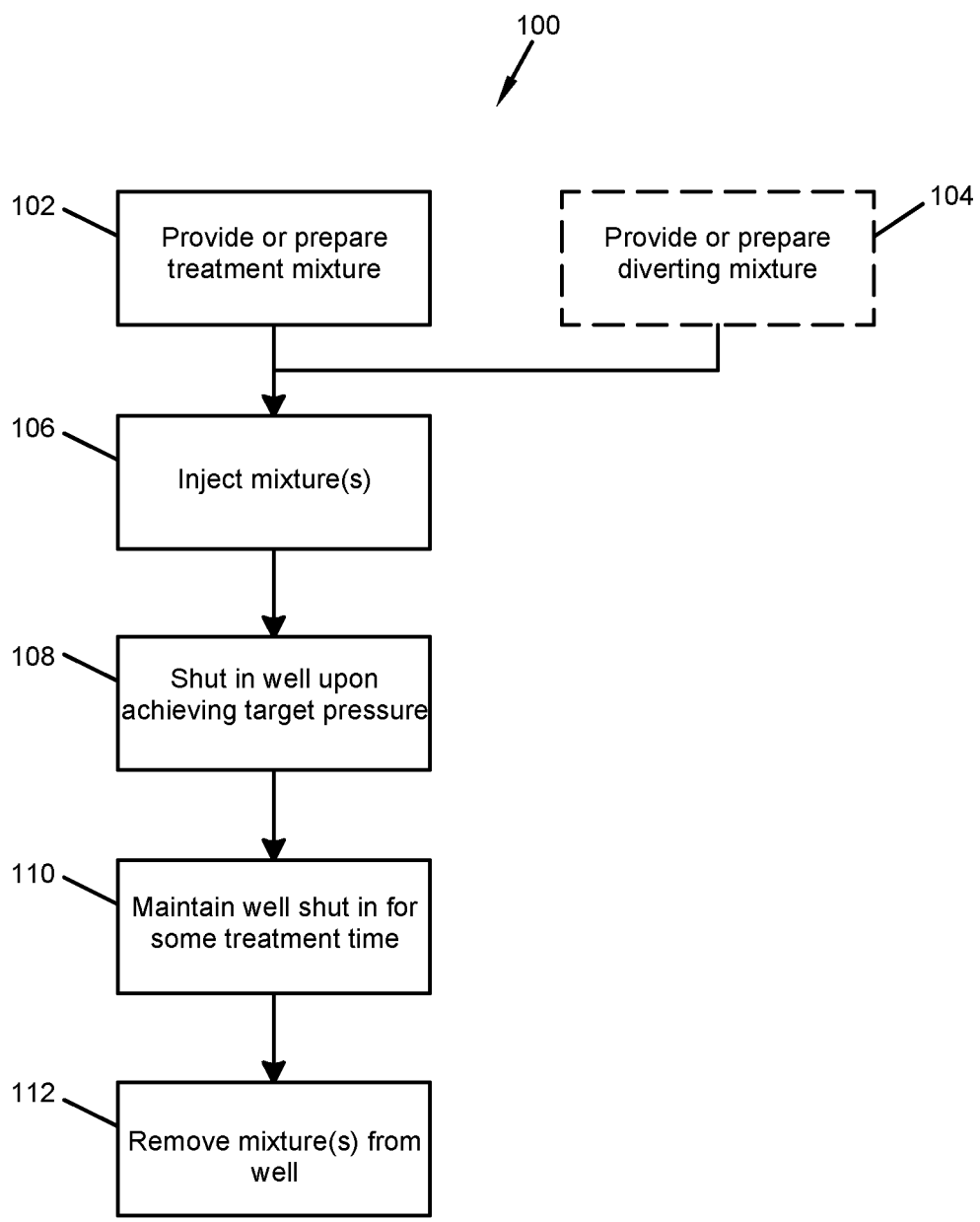
FIG. 1 is an embodiment of a method of well stimulation.

Although the techniques introduced above and discussed in detail below may be implemented for stimulating any subsurface extractions from nano-darcy formations, the present disclosure will discuss the implementation of these techniques in an oil and gas well for the purpose of extracting hydrocarbons. The reader will understand that the technology described in the context of an oil and gas well could be adapted for use with other systems such as water well and solution mining wells or any other situation in which the permeability of the subsurface needs to be reduced.

This disclosure describes formulations and methods for stimulating the production from wells in nano-darcy shale formations. In one embodiment, the method includes injecting a treatment mixture containing a metal complexing agent such as citric acid or EDTA into a nano-darcy shale formation adjacent to a well at a pressure below the fracture pressure of the formation. A sufficient contact time is allowed and then the treatment mixture is pumped from the subsurface. This has been shown to stimulate well production in nano-darcy shale formations. Without being held to a particular theory, based on an analysis of the extracted spent treatment fluid it appears that the metal complexing agent binds with naturally occurring metals in the formation (possibly by forming a complex with the metals and removing them from the shale), and particularly divalent metal ions, which are then extracted with the spent fluid. This removal of naturally occurring metals may be increasing the permeability of the formation in the contact region adjacent to the well, thereby causing the increased production.

In an alternative embodiment, the well stimulation treatment is applied as part of the fracturing process. It is anticipated that proper integration of the well stimulation treatment with the fracturing process will achieve a better production result than fracturing without stimulation. Both embodiments, the fracturing embodiment and the stimulation embodiment done below the fracture pressure of the formation, are described in greater detail below.

The present disclosure relates to a process to sequester and remove metal cations from partially soluble silicon-bearing clay minerals naturally present in a subterranean formation. Whether the metallic ions are present from natural sources in the reservoir rock prior to drilling into the formation or formed through interactions with drilling, completion, or reservoir stimulation (hydraulic fracturing or acid stimulation) fluids, the use of metal chelating substances to dissolve or disperse materials that are, or can, restrict flow into the well bore is presented as a commercial method to restore or enhance the productivity of well bores that are restricted with such materials. For example, the introduction of hydraulic fracturing fluids and/or acid treatments that release metal ions through their interaction with the formation materials, such as aluminum, barium, calcium, magnesium, manganese, iron, strontium, boron and other metals or metalloids. Such metallic or metalloid ions may form ion complexes with sulfur bearing ions such as sulfide and sulfate, hydroxide ions, and silicon bearing ions such as silicates; for example calcium magnesium silicate, that may precipitate or otherwise form flow restrictions in the porous space of the reservoir rock in the well bore. Specifically, metallic ion complexes such as aluminum hydroxide, aluminum silicate, calcium hydroxide, calcium magnesium silicate, iron hydroxide, iron silicate, magnesium hydroxide, magnesium silicate, or other metal hydroxide, and/or silicon complexes, or metal sulfide or metal sulfate scales; that through formation of solid or colloidal substances may form restrictions that limit the permeability of reservoir rock to producing hydrocarbons.

Introduction and maintenance of a metal-complexing agent into the formation allows for the metals to be bound and subsequently removed. For the purposes of this disclosure, a metal-complexing agent may be any chemical that can bind with a metal regardless of the binding mechanism and includes sequestration agents, reducing agents, chelating agents, ligands porphyrins, pigments, peptides, saccharides and/or nucleic acids. In some embodiments, the metal-complexing agent is a chelating agent, an alkali metal salt thereof, a non-alkali metal salt thereof, or any combination thereof may be included in the treatment fluids described herein. In some embodiments, the chelating agent may be biodegradable. Although use of a biodegradable chelating agent may be particularly advantageous in some embodiments of the present disclosure, there is no requirement to do so, and, in general, any suitable chelating agent may be used.

As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life.

In some embodiments, A partially soluble or colloidal metal ion complex, such as, for example, calcium magnesium silicate, is solubilized using, for example, one or a combination of the following chelation chemicals (chelating agent): Acetic Acid, Acrylates, Dihydroxymaleic Acid, Salts of Dihydroxymaleic Acid, EDTA (ethylenediamine tetraacetic acid), Salts of EDTA, erythorbic acid, erythroboric acid, Formic Acid, Gluconodeltalactone, GLDA (glutamic acid N,N-diacetic acid), Salts of GLDA, HEDTA (hydroxyethylenediamine triacetic acid), Salts of HEDTA, HEIDA (disodium ethanoldiglycine), Salts of HEIDA, MGDA (methylglycine N,N-diacetic acid), Salts of MGDA, NTA (nitrilotriacetic acid), Organic Metal Complexers, Phosphonic Acid, Polyacrylic Acid and notably Citric Acid in an amount sufficient to sequester at least a portion of any metal compounds and there by dissolve or disperse materials that can restrict the flow path to the well bore and the overall permeability of the well bore and reservoir rock system. It should be understood that although chelation chemical(s) (chelating agent(s), chelator(s)) have been provided herein by way of example, any chelation chemical may be utilized in accordance with the present process, so long as the chelation chemical functions in accordance with the present disclosure as described herein.

In some embodiments, suitable chelating agents may include common chelating agent compounds such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, any salt thereof, any derivative thereof, and the like. It is to be noted that NTA may be considered to be a biodegradable compound, but it may have undesirable toxicity issues.

In some embodiments, suitable chelating agents may include biodegradable chelating agents such as, for example, glutamic acid diacetic acid (GLDA), methylglycine diacetic acid (MGDA), β-alanine diacetic acid ((β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1, 2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1, 2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N'''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof.

In an alternative embodiment, the metal-complexing agent may be a suitable sequestering agent such as polysuccinimide, polyaspartic acid, and polymers, oligomers, chains or block-copolymers of the twenty two essential amino acids containing metal complexing groups such as carboxylic acids, phosphonic acids, sulfonic acids and boronic acids.

In one embodiment, the chelating agent is provided between about 0.05% weight volume to about 60% weight volume. However, any suitable range may be used including from 1% to 40%, and between 2% and 20%. In some embodiments, the amount of chelating agent may be even higher as some chelating agents may be provided with additives as described in greater detail below.

The well stimulation mixture can contain the metal complexing agent as well as multiple chemical additives as desired. The additives may include biocide, scale inhibitor, clay control additive, oxygen scavenger and surfactant that assist fluid recovery. To keep the fracturing treatments affordable, only minimal amounts of these additives are used. Each additive is normally liquid-based and is metered separately into the treatment fluid and mixed with water and other additives in the blender. The blender includes a 5- to 15-barrel tub with agitation devices. The additive concentrations are commonly expressed in parts per million (ppm) or as gallons of additive per 1000 gallons of water (abbreviated as gallons per thousand or gpt). The additives typically are composed of a chemical that provides the desired function such as scale inhibition and a solvent, commonly water, alcohol or oil.

Another additive that may be used is a corrosion inhibitor. Corrosion inhibitors reduce corrosion of the well components. In an embodiment, quaternary ammonium compounds typically referred to as quaternary amines are used as a corrosion inhibitor in trace amounts to 2,000 ppm. However, any suitable corrosion inhibitor may be used in any amount as desired. Other examples of possible corrosion inhibitors include quaternary amine compounds commonly used for protection of metal in the presence of high or low pH and/or dissolved oxygen bearing fluids, such as Flex Chem FC-181 and many other similar formulations used in well maintenance activities. Quaternary ammonium compounds, acetylenic alcohols, amide and oxylalkylated alcohols, quinoline quaternary ammonium alkyl amine salts and surfactants, nonyl phenol surfactants, alkyl thioamides, oxyalkylated phenols, alkyl pyridine benzyl quaternary ammonium chloride, benzyl quaternary ammonium chloride, aliphatic amines, cocoamine diquaternary ammonium chloride, imadazoline, polyamide, modified amido polyamine, alkylamidomine, amido imadazoline, alkyl phosphate ester, potassium salt of a glycol phosphate ester, amine salt of poly-phosphate ester, tallow diamine ethoxylate, polyacid, amine salt of polyphosphonic acid, organic acid-amine salt, crude dimerized fatty acids or tall oil dimer-trimer acids.

Surfactants such as sodium lauryl sulfate and many other surfactant materials that could be selected based on their compatibility with the other materials in the chelating solution and pH of the final solution.

Another additive that may be used is a biocide. For example, in an embodiment trace amounts to 5,000 ppm tributyl tetradecyl phosphonium chloride (TTPC) may be used as a biocide. Any suitable biocide may be used in any amount as desired. Biocidal agents could include glutaraldehyde, quaternary amine compounds such as alkyl dimethyl benzyl ammonium chloride (ADBAC), sodium chlorite (which would generate chlorine dioxide in-situ), TTPC, isothiazolin compounds, thione based compounds, and many other agents approved for use in the well maintenance activities. Other examples of possible biocides include chlorine dioxide, didecyldimethyl ammonium chloride (DDAC) and brominated propionamide.

Dispersing agents such as Dow Acumer 5000 or Versaflex Si to enhance the removal of colloidal silicon bearing materials and many other dispersing agents that could assist with recovering colloidal material residue from the well bore.

Another additive that may be used is a colloidal silica deposition inhibitor. The use of a colloidal silica deposition inhibitor, sometimes also referred to as amorphous silica control compound, prevents silica scale precipitation within the wells during the treatment process. One example of a colloidal silica deposition inhibitor is an aqueous solution of organic additive based on phosphino carboxylic acid copolymer, a commercial version of which is sold under the trademark GEOGARD SX. Any suitable colloidal silica deposition inhibitor may be used. Other examples of possible colloidal silica deposition inhibitors include such materials as phosphate, phosphate ester, or phosphonate compounds; polymaleic, or acrylate compounds such as polyacrylic acid scale inhibitors commonly used for such applications in well maintenance activities.

Another additive that may be used is a mutual solvent. Mutual solvents are soluble in oil, water and acid-based mixtures and may be used in a range of applications, such as removing heavy hydrocarbon deposits, controlling the wettability of contact surfaces before, during or after a stimulation treatment, and preventing or breaking emulsions. A commonly used mutual solvent is ethylene glycol monobutyl ether, generally known as EGMBE or 2-butoxy ethanol. Any suitable mutual solvent may be used. Other examples of possible mutual solvents include compounds such as ethylene glycol monobutyl ether or FCS-280 or other compounds commonly used for such applications in well maintenance activities.

Acid may also be used as an additive in order to control the pH of the treatment mixture. In an embodiment hydrochloric acid may be used from trace amounts to about 30% by weight. Any suitable acid may be used as needed. Other examples of possible acids include aqua regia, arsenic acid, boric acid, carbonic acid, chloric acid, chromic acid, fluoroantimonic acid, fluoroboric acid, fluorosulfuric acid, fulminic acid, hexafluorophosphoric acid, hexafluorosilicic acid, hydrobromic acid, hydrofluoric acid, hydrogen iodide, hypochlorous acid, hypofluorous acid, hypophosphoric acid, iodic acid, nitric acid, nitrosyl-O-hydroxide, nitrous acid, orthocarbonic acid, perchloric acid, permanganic acid, perrhenic acid, pertechnetic acid, phosphoric acid, silicic acid, sulfuric acid, thiocyanic acid, titanic acid, tungstic acid or xenic acid.

In some wells, well stimulation using the novel treatment mixtures designed herein may be made more cost efficient by alternating the injection of the treatment mixture with the injection of a diverting material. Many wells have high volume sections within the well flow paths that are referred to as fluid thief zones in that they represent a volume that must be filed during the treatment process but the fluid in that zone is ineffective at its task (in this case complexing with metal cations in the nano-darcy formation). To address this, a diverting material such as particles of polylactic acid in a brine mixture may be used. Diverting materials are designed to take up larger volumes without interfering with the delivery of treatment chemicals to the target zones. Diverting materials are relatively inert with respect to the treatment chemicals and are also designed to allow easy passage of the treatment chemicals around volumes that they occupy. In addition, many diverting materials are designed to breakdown and be easily recoverable after some period of time such as days or weeks.

Diverting materials and mixtures other than particles of polylactic acid in a brine mixture may also be used. Diverting agents such as benzoic acid flakes, polylactic acid, solid or water soluble ball sealers, rock salt, encapsulated solid chelators, etc., other diverting agents. For example, mixtures using products consisting of various polymers blended with waxes and other solid hydrocarbons polymers blended with waxes and other solid hydrocarbons have been used as diverting material. Diverting materials are designed to be relatively inert with respect to the treatment chemicals and are also designed to allow easy passage of the treatment chemicals.

In an embodiment, a stimulation program may include alternating between injecting an amount of treatment mixture, followed by injecting an amount of a diverting mixture until such time as the well pressure achieves a target pressure, such as a pre-determined target pressure, the fracture pressure for the formation or a threshold amount above or below the pre-determined fracture pressure from the formation calculated based on the fracture pressure.

FIG. 1 illustrates one such stimulation program, in this case done below the fracture pressure of the formation. In the program 100, the treatment mixture is obtained in a provide treatment mixture operation 102. The treatment mixture may be made or completed on site in a batch process or an amount of treatment mixture may be brought to the site prior to the stimulation of the well. Any of the embodiments of the treatment mixture described above may be used.

A provide diverting mixture operation 104 is also performed in which a diverting mixture is either generated at the site prior to use or a mixture is brought to the site pre-made. Any diverting mixture as described above may be used. This operation 104, is also optional and may not be needed if it is determined that there will be relatively little lose to thief zones of the treatment mixture during the treatment process.

Next, the treatment mixture and the diverting mixture (if any) are injected in an injection operation 106. In an embodiment, the two mixtures are alternately injected in alternating injection operation 106. As described above, predetermined amounts of the mixtures may be alternately injected or the injection amounts may be varied. In an embodiment, for example, the injection operation alternately injects 150 barrels of treatment mixture and 150 barrels of diverting mixture.

In one embodiment, injection continues until such time as the well pressure achieves a target pressure. The target pressure may be a pre-determined target pressure based on knowledge of the operator. Alternatively, the target pressure may be the fracture pressure for the formation or a threshold amount above or below the fracture pressure from the formation. Any suitable technique such as the Leak-off test may be used to determine fracture pressure.

Upon reaching the target pressure, a well shut in operation 108 is performed. In the shut in operation 108, the well is closed and the treatment mixture is trapped in the well.

The well is then maintained in the shut in state in a maintain shut in operation 110. This provides contact time for the treatment mixture allowing the treatment chemicals to react with the shale formation and bind some of the natural metals to the treatment mixture. During this period, the pressure may slowly decrease and the pH may change due to reactions occurring in the subsurface. The contact time provided may be any amount from 1 minute to 100 days. However, it appears that 1 to 3 days may be preferable. Other examples of acceptable ranges of contact times include: from 3 hours to 7 days; from 6 hours to 5 days; from 12 hours to 45 days; from 18 hours to 3 days and from 1 to 2 days. Too long or too short a contact time may result in lowered performance. Too short a time may not allow sufficient time for the treatment mixture to complex with the naturally occurring metals in the formation. Too long a contact time may result in bound metals precipitating within the well or formation before they can be removed with the spent treatment mixture. It is anticipated that the optimum time may need to be determined empirically for each formation or even each depth or region of a formation. In this case, determining the contact time may be considered an additional step in the stimulation process. This step may include testing multiple wells at different contact times, using a downhole monitoring device or other mechanism to determine when sufficient solubilizing of the formation metals has been achieved or by some ex-situ method such as by calculation or lab testing of formation materials.

The method ends with the extraction of the treatment mixture in a mixture removal operation 112. In the removal operation 112, the well opened and the mixtures are pumped out of the well. The mixtures will include bound metals from the subsurface. Again, without being held to a particular theory, based on an analysis of the extracted treatment mixtures and laboratory testing it appears that the metal complexing agent is forming metal complexes and/or binding with naturally occurring metals in the formation, and particularly divalent metal ions, which are then extracted with the spent treatment mixture. This removal of naturally occurring metals may be increasing the permeability of the formation in the contact region adjacent to the well, thereby causing the increased production of the well after the stimulation using the techniques described above.

Figure 5:
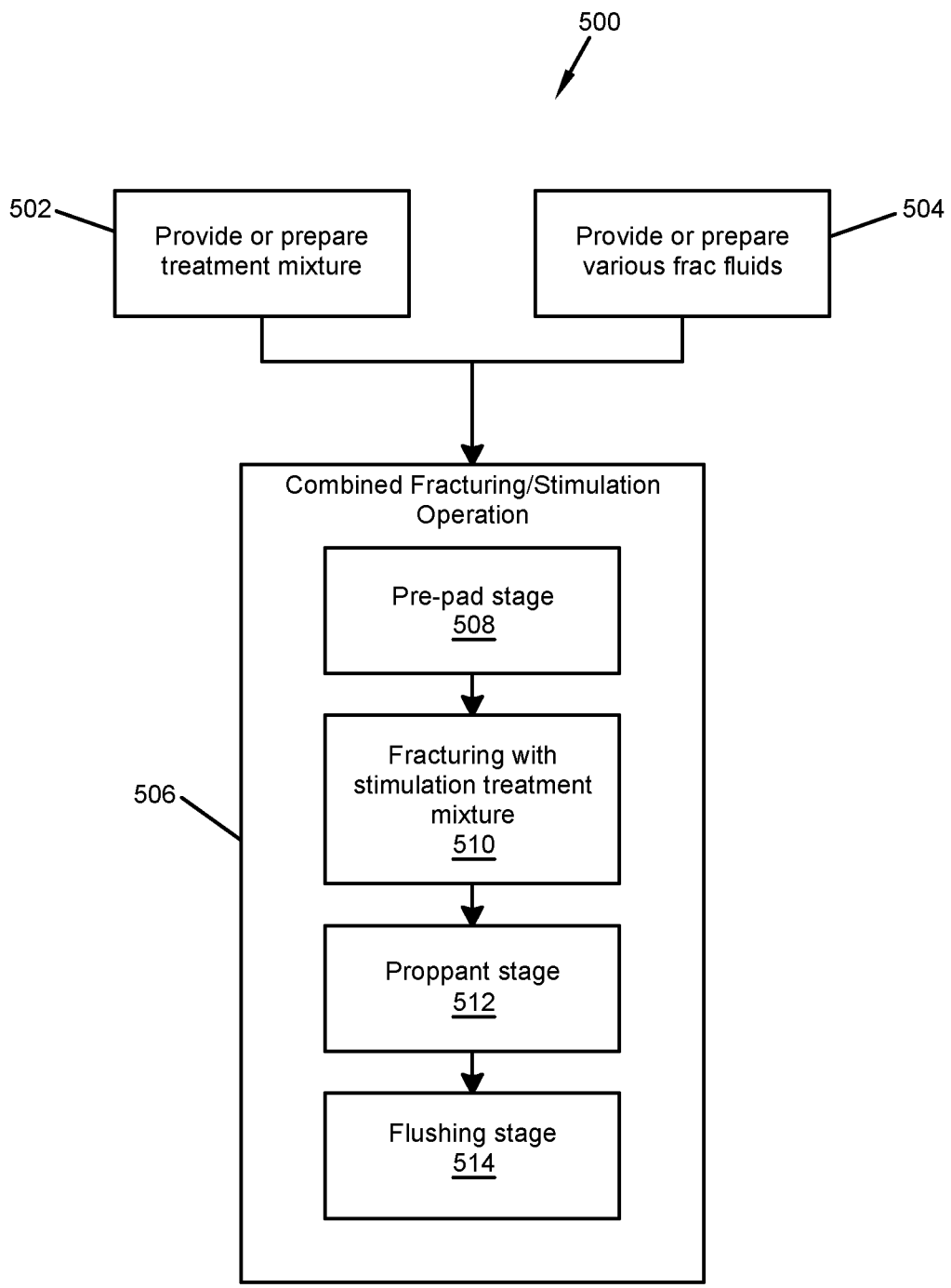
FIG. 5 illustrates performing the stimulation treatment as part of a fracturing operation.

FIG. 5 illustrates performing the stimulation treatment as part of a fracturing operation. In the process of hydraulic fracturing, fluid is injected into the well at a pressure that induces fractures in the reservoir rock. Pumping is continued after the fractures are initiated, which causes the fractures to propagate and widen sufficiently to allow a proppant material to enter the fractures. Stages of fluids of different composition are injected sequentially to induce, propagate and prop the fractures. One example of an injection sequence is:

1. An initial acid (sometimes referred to as the "pre-pad stage"), typically containing hydrochloric acid, to clear the wellbore and perforations.
2. A conditioning (or "pad stage") to open the fractures, and containing chemicals to condition fluid pathways.
3. A proppant stage which carries the proppant material into the opened fractures, and normally containing a polymer to increase the proppant carrying capacity.
4. A flushing stage to clean excess chemicals and proppant from the wellbore.

The above sequence and/or individual steps, or stages as they are sometimes called below, may be repeated as needed or desired.

In the fracturing process embodiment of the well stimulation treatment, a stimulation treatment mixture containing a metal complexing agent such as citric acid or EDTA could be placed in any of the stages, or as an additional stage anywhere in a fracturing injection sequence, such as the one described above. The placement within the injection sequence of the treatment mixture injection would affect where the treatment goes within the formation and, therefore, control the resulting effects on the formation.

In the fracturing process embodiment of the well stimulation treatment, a stimulation treatment mixture containing a metal complexing agent such as citric acid or EDTA could be placed in any of the stages, or as an additional stage anywhere in a fracturing injection sequence, such as the one described above. The placement within the injection sequence of the treatment mixture injection would affect where the treatment goes within the formation and, therefore, control the resulting effects on the formation.

For example, injecting the stimulation treatment mixture before the pad stage would make the stimulation treatment mixture contact the formation during the stage that opens the fracture and, thus, make it the first fluid to contact the surface of the newly-induced fractures. Assuming fluids, including the treatment mixture, from the early stages leaks off into the formation, placing the stimulation treatment mixture before the pad stage would allow the treatment mixture to leak off into the formation matrix before other chemicals in the pad stage affect the fracture face.

As another example, placing the stimulation treating mixture in the proppant stage would allow the chemicals in the pad stage to affect the contact of the fracture face before the treatment mixture contacts the fracture face. If the chemicals in the pad stage alters the rock along the fracture face it could potentially affect the penetration of the treatment mixture. In the extreme case, if chemicals in the pad stage prevent fluid leakoff it could potentially prevent the stimulation treatment mixtures from penetrating into the formation matrix.

If a goal is to sequester ions from reservoir rock matrix (e.g., to increase the permeability of the rock near the fracture), it may be desirable to inject the treatment mixture early in the sequence to get maximum penetration. On the other hand, if the goal is to sequester ions from other sources, such as displaced or introduced ions, it may be desirable to place the treatment later in the sequence. Thus, the injection sequence can be tailored to specific goals depending on the conditions at the wellhead and in the formation. In an embodiment, determination of the optimum stage for including injection At this time an optimum treatment mixture placement in combination with hydraulic fracturing has not been experimentally determined and we would like to secure as much treatment design flexibility as possible.

Fluids used in all stages of well fracturing contain chemical additives that may include acids, hydrocarbons, gums, polymers, solids, surfactants, scale inhibitors, disinfectants, etc. In the current state-of-the-art the formulations and placements are designed to facilitate and optimize the hydraulic pumping without the design or aim of treating the hydrocarbon-bearing formations with metal complexing agents.

Acids, commonly hydrochloric, citric, etc., may be added in initial stages to clean wellbore debris such as cement from fluid paths and control iron released from the steel well components by the harsh chemicals, and the formulations and volumes are designed to be mostly spent within the wellbore with preferably no entry into the fracture, as that would be wasted and, therefore, cost inefficient. Additional chemistries are formulated to further facilitate the hydraulic pumping by facilitating flow and proppant placement with minimal chemical effect on the formation past the fracture face.

Loss of fluid into the formation during hydraulic fracturing decreases hydraulic efficiency. In applications where fluid loss may affect hydraulics of the fracturing operation additives such as diverting materials, polymers, particulates, fine sand, hydrocarbons, etc., are commonly added to fracturing fluids to minimize leakoff of fracturing fluids into the formation and improve fluid hydraulic efficiency. In more permeable formations some initial fluid may spurt into the formation matrix before a barrier, or wall cake, is formed by the fluid additives, which slows or prevents further leakoff. In less permeable formations the fluid additives may prevent significant spurt from occurring.

Chemical interactions of fluid formulations during fracturing may be affected by placement and staging of specific formulations, other chemistries and sequential placement of the other chemistries. Chemical formulations in early fluid stages that may spurt into the formation potentially have more access to the formation matrix than later stages that enter the fracture after a wall cake is formed, and if such chemical formulations were applied in a fluid stage that did not contain additional additives the chemical interaction of the chemical formulations with the formation matrix could potentially be affected less by the subsequent additives.

The stimulation treatment can be adapted to treat hydrocarbon-bearing formations with metal complexing agents. The chemical formulations are as described earlier during fracturing. The fracturing embodiments may include sequencing the well stimulation mixture in combination with hydraulic fracturing in ways to treat the formation differently.

In one embodiment, the well stimulation mixture could be formulated and injected in an initial stage that opens the fracture and contacts the formation before additional chemical additives. There are a number of ways this could be achieved. For example, a well stimulation mixture of sufficient volume to propagate through the induced fracture and contact the formation before a potential barrier or wall cake is formed could be injected between the pre-pad and pad stages or the pre-pad and/or pad stage could be modified with chemical amendments and/or design to achieve formation treatment.

In another embodiment, the well stimulation mixture could be formulated and injected in a stage containing a diverting or leakoff-minimizing material. Initially a limited amount of treatment mixture might contact the formation as wall cake is formed and treatment mixture has initial access to diverting material and wall cake inner face, outer face and wall cake matrix. In such a case the treatment of the formation might be influenced by other chemistries in the inclusive and/or prior stage(s). This method of treatment could be applied by injecting a new stage or modifying a stage containing other materials and formulations.

In another embodiment, the well stimulation mixture could be formulated and injected in post-diversion/wall cake stage such as a proppant stage. In this case immediate access of the stimulation treatment mixture is primarily limited to outer face of wall cake and other stage materials/chemicals. Treatment of the formation might be influenced by other chemistries of prior stages and might be delayed by some amount of time for the stimulation treatment mixture to penetrate the diverting material/wall cake. This method of treatment could be applied by injecting a new stage or modifying a stage containing other materials and formulations.

In another embodiment, the well stimulation mixture could be formulated and injected in a trailing or flushing stage at a pressure below the fracture pressure as described with reference to FIG. 1. Treatment of the formation might be influenced by other chemistries of prior stages and might be delayed by some amount of time for the treatment mixture to penetrate the diverting material/wall cake. This method of treatment could be applied by injecting a new stage or modifying a stage containing other materials and formulations.

Turning now to the embodiment of FIG. 5, a well stimulation treatment program as part of a fracturing process is described in greater detail. In the program 500, the treatment mixture is obtained in a provide treatment mixture operation 502. The treatment mixture may be made or completed on site in a batch process or an amount of treatment mixture may be brought to the site prior to the stimulation of the well. Any of the embodiments of the treatment mixture described above may be used.

A provide fracturing fluids operation 504 is also performed in which the various fracturing fluids necessary for the fracturing operation are either generated at the site prior to use or brought to the site pre-made. Fracturing operations and the various fracturing fluids for each stage of the fracturing operation are known in the art.

Next, a combined fracturing/stimulation operation 506 is performed. As described above, different embodiments are possible depending upon when during the fracturing process the well stimulation mixture is incorporated.

FIG. 5 specifically illustrates the embodiment in which the well stimulation mixture is injected in the initial stage of the fracturing operation. In the embodiment illustrated, a pre-pad stage 508 is performed, as described above, to clear the wellbore and perforations. This may include injecting an acid or other pre-pad formulation.

The pre-pad stage 508 is then followed by a stimulation injection operation 510. In this operation 510, the stimulation treatment mixture is injected at a pressure above the fracturing pressure of the formation in order to create the initial fractures.

A proppant stage 512 is then performed in which proppant material is injected and forced into the opened fractures. In an embodiment, the injected proppant mixture may include polymers and other chemicals to increase the proppant carrying capacity and reduce the pressure needed to inject the proppant.

Next, a flushing stage 514 is performed in which excess chemicals and proppant from the wellbore. In this embodiment, spent well stimulation treatment mixture, bound with metals from the subsurface formation, will also be recovered. It is believed, based on the laboratory results and the results observed from stimulation below the fracturing pressure, that the combined fracturing/stimulation embodiments described above will result in a higher production rate for the well that would be achieved without the use of the stimulation treatment mixture. Again, without being held to a particular theory, this is presumably because of the affect the stimulation treatment mixture has on the formation. By binding with naturally occurring metals in the formation, and particularly divalent metal ions, it is believed that the permeability of the formation near the fractures is increased, thereby causing the increased production of the well that would otherwise be observed.

As discussed above, the entire process may be repeated until sufficient fracturing has been achieved. Other embodiments of the method 500 are possible. In addition to changing any of the specific components of the mixtures as described above, changes to when and how the mixtures are produced and injected may be made without departing from the teaching of this disclosure.

EXAMPLES

Example 1

A laboratory analysis was performed in which an embodiment of the treatment mixture was mixed with a sample of nano-darcy shale material obtained from well cuttings of a well drilled into the Barnett Shale Formation, a nano-darcy shale formation. The embodiment of the treatment mixture was as follows: 10% by weight citric acid; 2000 ppm of quaternary amine; 5000 ppm of TTPC; 10000 ppm of GEOGARD SX colloidal silica deposition inhibitor; 20 gpt of 2-butoxy ethanol; and 10% by weight hydrochloric acid in an aqueous mixture.

The Barnett Shale material was mixed with the embodiment described above and allowed to soak for 96 hours at 179 degrees F. An analysis of various metals was performed by Inductively Coupled Plasma (ICP) on treatment mixture removed from the shale material after the end of the 96 hours. The results, provided below, show that the treatment mixture is effective at binding with metals naturally occurring in the nano-darcy shale formation.

|  | Aluminum | Arsenic | Barium | Boron | Calcium | Iron | Potassium |
|---|---|---|---|---|---|---|---|
| mg/L | 710.8 | 1.9 | 2.0 | 37.3 | 21.7 | 2,808 | 192.6 |
| mg/Kg | 31,796.0 | 85.0 | 89.5 | 1,668.53 | 970.7 | 125,609 | 8615.5 |

|  | Magnesium | Manganese | Sodium | Silicon | Strontium | Molybdenum | Antimony |
|---|---|---|---|---|---|---|---|
| mg/L | 68.2 | 53.1 | 30.8 | 8.9 | 0.8 | <0.3 | 10.8 |
| mg/Kg | 3,050.8 | 2,375.3 | 1,377.8 | 398.1 | 35.8 | <13.4 | 483.1 |

Example 2

A laboratory analysis was performed in which an embodiment of the treatment mixture was mixed with a sample of nano-darcy shale material obtained from well cuttings of a well drilled into the Cana Woodford Shale Formation, a nano-darcy shale formation. The embodiment of the treatment mixture was as follows: 10% by weight citric acid; 2000 ppm of quaternary amine; 5000 ppm of TTPC; 10000 ppm of GEOGARD SX colloidal silica deposition inhibitor (aqueous solution of organic additive based on phosphino carboxylic acid copolymer); 20 gpt of 2-butoxy ethanol; and 10% by weight hydrochloric acid in an aqueous mixture.

A 4.471 g sample of the Cana Woodford Shale material was mixed with 200 ml of the embodiment described above and allowed to soak for 96 hours at 179 degrees F. An ICP analysis of various metals was performed on treatment mixture removed from the shale material after 1 hour and another at the end of the 96 hours. The results, provided below, show that the treatment mixture is effective at binding with metals naturally occurring in the nano-darcy shale formation.

| Time Removed hours | Aluminum mg/L | Antimony mg/L | Arsenic mg/L | Barium mg/L | Boron mg/L | Calcium mg/L | IronTot mg/L |
|---|---|---|---|---|---|---|---|
| 1 | 102 | 0.210 | 0.190 | 2.70 | 6.87 | 344 | 150 |
| 96 | 2,994 | 6.165 | 5.578 | 79.26 | 201.67 | 10,098 | 4,403 |

| Time Removed hours | Potassium mg/L | Magnesium mg/L | Manganese mg/L | Molybdenum mg/L | Silicon mg/L | Sodium mg/L | Strontium mg/L |
|---|---|---|---|---|---|---|---|
| 1 | 49.8 | 233 | 4.35 | 0.450 | 211 | 20.9 | 3.77 |
| 96 | 1,461.9 | 6,840 | 127.70 | 13.210 | 6,194 | 613.5 | 110.67 |

Example 3

An experiment was performed in a well located in the nano-darcy Woodford shale formation in Canadian County, Okla. In this experiment the following 1200 barrel treatment mixture was used: 10% by weight citric acid; 2000 ppm of quaternary amine; 5000 ppm of TTPC; 10000 ppm of GEOGARD SX colloidal silica deposition inhibitor (aqueous solution of organic additive based on phosphino carboxylic acid copolymer); and 20 gpt of 2-butoxy ethanol. A diverting material was also used comprising different sizes of poly lactic acid particles in a 10.2 pound/gallon brine mixture to create a diverting mixture. The treatment and diverting mixtures were alternately injected into the well in amounts of 150 barrels each until completion. After completion the well was shut in and the treatment mixture maintained in the well for 4 days.

The treatment mixture was then extracted and analyzed for metal content including aluminum, iron, magnesium and silicon. The following table is a list of results of the analysis.

| Sample # | Day | Time | pH | Sp. Gr. | Rw. Ohm-M | Al mg/L | Fe mg/L | Mg mg/L | Si mg/L |
|---|---|---|---|---|---|---|---|---|---|
| Pre-Job |   | 9:00 | 7.07 | 1.0049 | 0.650 | 0.18 | <0.18 | 5.28 | 41.4 |
| 1 | 1 | 12:00 | 7.38 | 1.0050 | 0.800 | 118 | 1,399 | 586 | 26 |
| 2 | 2 | 14:00 | 6.19 | 1.0250 | 0.340 | 300 | 2,304 | 1,270 | 104 |
| 3 | 2 | 15:00 | 6.28 | 1.0262 | 0.340 | 303 | 2,156 | 1,294 | 116 |
| 4 | 2 | 16:00 | 6.24 | 1.0247 | 0.340 | 295 | 1,926 | 1,271 | 110 |
| 5 | 2 | 18:00 | 6.25 | 1.0250 | 0.320 | 333 | 2,017 | 1,457 | 98 |
| 6 | 2 | 19:00 | 6.17 | 1.0258 | 0.320 | 333 | 1,846 | 1,389 | 107 |
| 7 | 2 | 20:00 | 6.26 | 1.0251 | 0.315 | 319 | 1,746 | 1,366 | 87 |
| 8 | 2 | 22:00 | 6.23 | 1.0263 | 0.330 | 321 | 1,730 | 1,361 | 91 |
| 9 | 3 | 0:00 | 6.30 | 1.0250 | 0.320 | 330 | 1,593 | 1,416 | 92 |
| 10 | 3 | 2:00 | 6.33 | 1.0247 | 0.340 | 331 | 1,468 | 1,396 | 91 |
| 11 | 3 | 4:00 | 6.25 | 1.0249 | 0.300 | 372 | 1,725 | 1,601 | 110 |
| 12 | 3 | 6:00 | 6.25 | 1.0271 | 0.310 | 347 | 1,567 | 1,496 | 82 |
| 13 | 3 | 8:00 | 6.34 | 1.0277 | 0.320 | 376 | 1,673 | 1,593 | 69 |
| 14 | 3 | 10:00 | 6.24 | 1.0279 | 0.320 | 379 | 1,668 | 1,621 | 72 |
| 15 | 3 | 12:00 | 6.20 | 1.0280 | 0.310 | 391 | 1,703 | 1,714 | 81 |
| 16 | 3 | 14:00 | 6.19 | 1.0301 | 0.295 | 403 | 1,726 | 1,744 | 72 |
| 17 | 3 | 16:00 | 6.20 | 1.0307 | 0.300 | 418 | 1,772 | 1,805 | 85 |
| 18 | 3 | 18:00 | 6.18 | 1.0310 | 0.280 | 440 | 1,816 | 1,849 | 89 |
| 19 | 3 | 20:00 | 6.16 | 1.0317 | 0.295 | 434 | 1,750 | 1,872 | 114 |
| 20 | 3 | 22:00 | 6.22 | 1.0320 | 0.295 | 438 | 1,765 | 1,886 | 74 |
| 21 | 4 | 0:00 | 6.16 | 1.0320 | 0.290 | 434 | 1,754 | 1,857 | 104 |
| 22 | 4 | 2:00 | 6.20 | 1.0314 | 0.300 | 481 | 1,828 | 1,975 | 89 |
| 23 | 4 | 4:00 | 6.23 | 1.0312 | 0.280 | 463 | 1,766 | 1,918 | 106 |
| 24 | 4 | 6:00 | 6.16 | 1.0315 | 0.280 | 448 | 1,675 | 1,873 | 111 |
| 25 | 4 | 8:00 | 6.37 | 1.0310 | 0.280 | 464 | 1,714 | 1,887 | 58 |
| 26 | 4 | 10:00 | 6.32 | 1.0306 | 0.270 | 498 | 1,782 | 1,933 | 67 |
| 27 | 4 | 12:00 | 6.34 | 1.0303 | 0.275 | 478 | 1,734 | 1,886 | 72 |
| 28 | 4 | 14:00 | 6.33 | 1.0300 | 0.280 | 508 | 1,785 | 1,951 | 106 |
| 29 | 4 | 16:00 | 6.31 | 1.0304 | 0.290 | 490 | 1,657 | 1,844 | 82 |
| 30 | 4 | 18:00 | 6.35 | 1.0300 | 0.295 | 492 | 1,686 | 1,867 | 61 |
| 31 | 5 | 12:00 | 6.35 | 1.0299 | 0.300 | 529 | 1,705 | 1,895 | 66 |
| 32 | 6 | 12:00 | 6.35 | 1.0300 | 0.300 | 421 | 1,256 | 1,486 | 47 |
| 33 | 7 | 12:00 | 6.36 | 1.0300 | 0.300 | 436 | 1,276 | 1,489 | 72 |
| 34 | 8 | 12:00 | 6.38 | 1.0294 | 0.300 | 464 | 1,636 | 1,794 | 70 |
| 35 | 9 | 11:00 | 6.40 | 1.0295 | 0.300 | 414 | 1,206 | 1,440 | 81 |
| 36 | 10 | 10:30 | 6.39 | 1.0300 | 0.300 | 470 | 1,716 | 1,863 | 71 |
| 37 | 11 | 10:00 | 6.54 | 1.0240 | 0.290 | 414 | 1,226 | 1,402 | 68 |
| 38 | 12 | 9:00 | 6.59 | 1.0230 | 0.285 | 364 | 1,090 | 1,239 | 56 |
| 39 | 13 | 10:00 | 6.51 | 1.0195 | 0.305 | 241 | 803 | 888 | 95 |
| 40 | 14 | 17:30 | 6.50 | 1.0215 | 0.300 | 400 | 1,194 | 1,401 | 80 |
| 41 | 15 | 13:30 | 6.54 | 1.0219 | 0.299 | 314 | 951 | 1,110 | 89 |
| 42 | 16 | 12:00 | 6.52 | 1.0200 | 0.300 | 252 | 810 | 942 | 98 |
| 43 | 17 | 15:30 | 6.52 | 1.0205 | 0.300 | 334 | 1,016 | 1,212 | 113 |
| 44 | 18 | 10:30 | 6.53 | 1.0195 | 0.300 | 252 | 807 | 964 | 101 |
| 45 | 19 | 10:00 | 6.53 | 1.0200 | 0.305 | 233 | 749 | 872 | 92 |
| 46 | 20 | 12:00 | 6.44 | 1.0183 | 0.305 | 167 | 625 | 670 | 86 |

-continued

| Sample #: | Day: | Time: | pH: | Sp. Gr. | Rw. Ohm-M | Al mg/L | Fe mg/L | Mg mg/L | Si mg/L |
|---|---|---|---|---|---|---|---|---|---|
| 47 | 21 | 11:00 | 6.50 | 1.0158 | 0.305 | 242 | 793 | 916 | 100 |
| 48 | 22 | 13:30 | 6.45 | 1.0175 | 0.310 | 225 | 760 | 861 | 94 |
| 49 | 23 | 12:30 | 6.38 | 1.0171 | 0.310 | 232 | 784 | 917 | 105 |
| 50 | 24 | 12:30 | 6.60 | 1.0164 | 0.310 | 189 | 669 | 769 | 93 |

In the experiment, after the shut in period, the well was pumped and samples of extracted flowback liquids were obtained and analyzed for various constituents over a 24 day period. The data shows a trend similar to the laboratory analyses of a high initial recovery of metals that trails off significantly over the first 3-7 days.

In addition, the subsequent well production rates were determined and compared to the production rate of the well prior to stimulation. The comparison showed that the gas production showed an 11 to 1 improvement in product rates. The liquid hydrocarbon production showed a 5 to 1 improvement after stimulation.

Example 4

Figure 2:
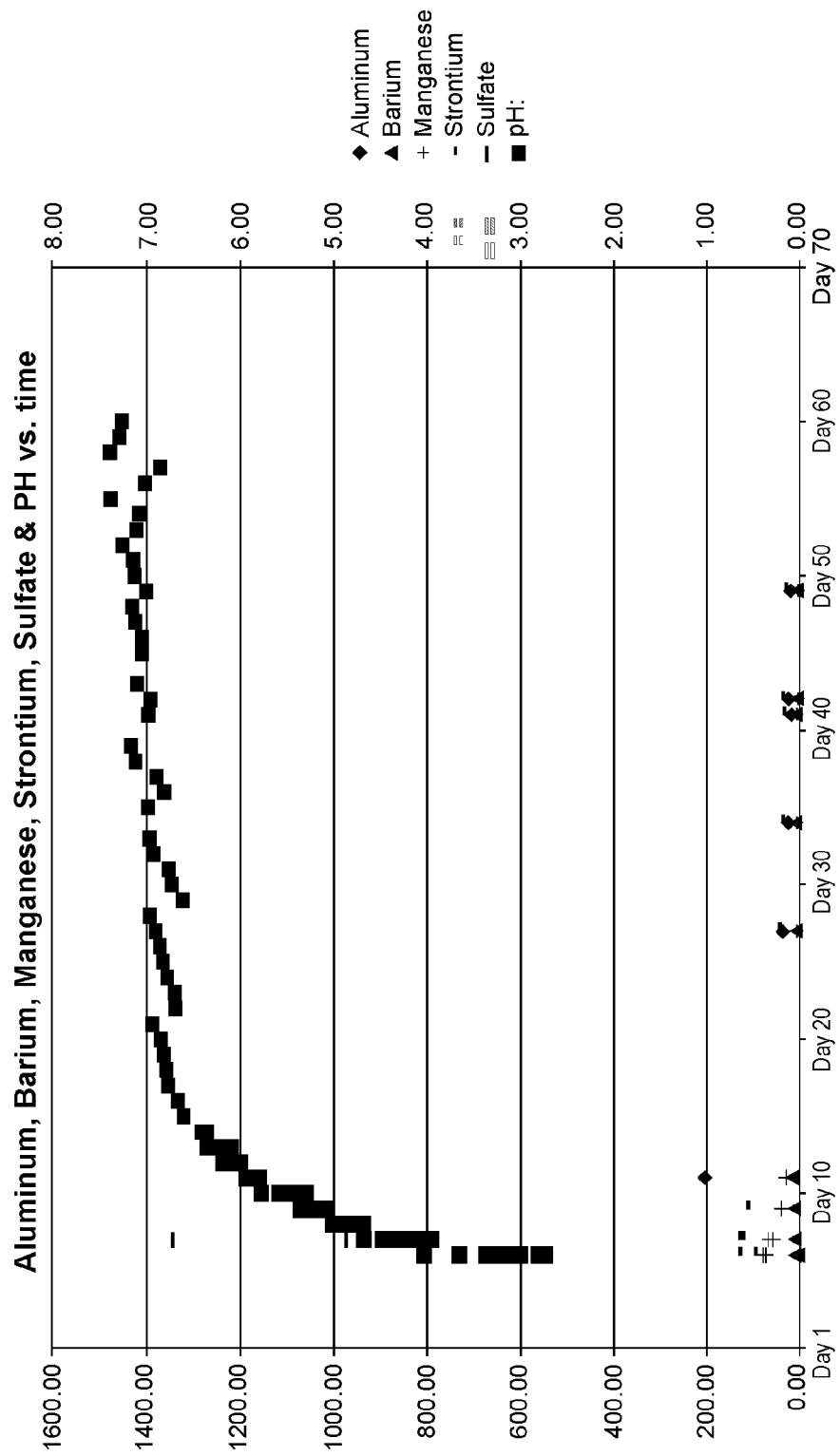
FIG. 2 illustrates a plot of aluminum, barium, manganese, strontium, sulfate; and pH vs. time in samples taken from a horizontal well completed in the Woodford Shale formation and stimulated using the technique of FIG. 1 on day 0.
Figure 3:
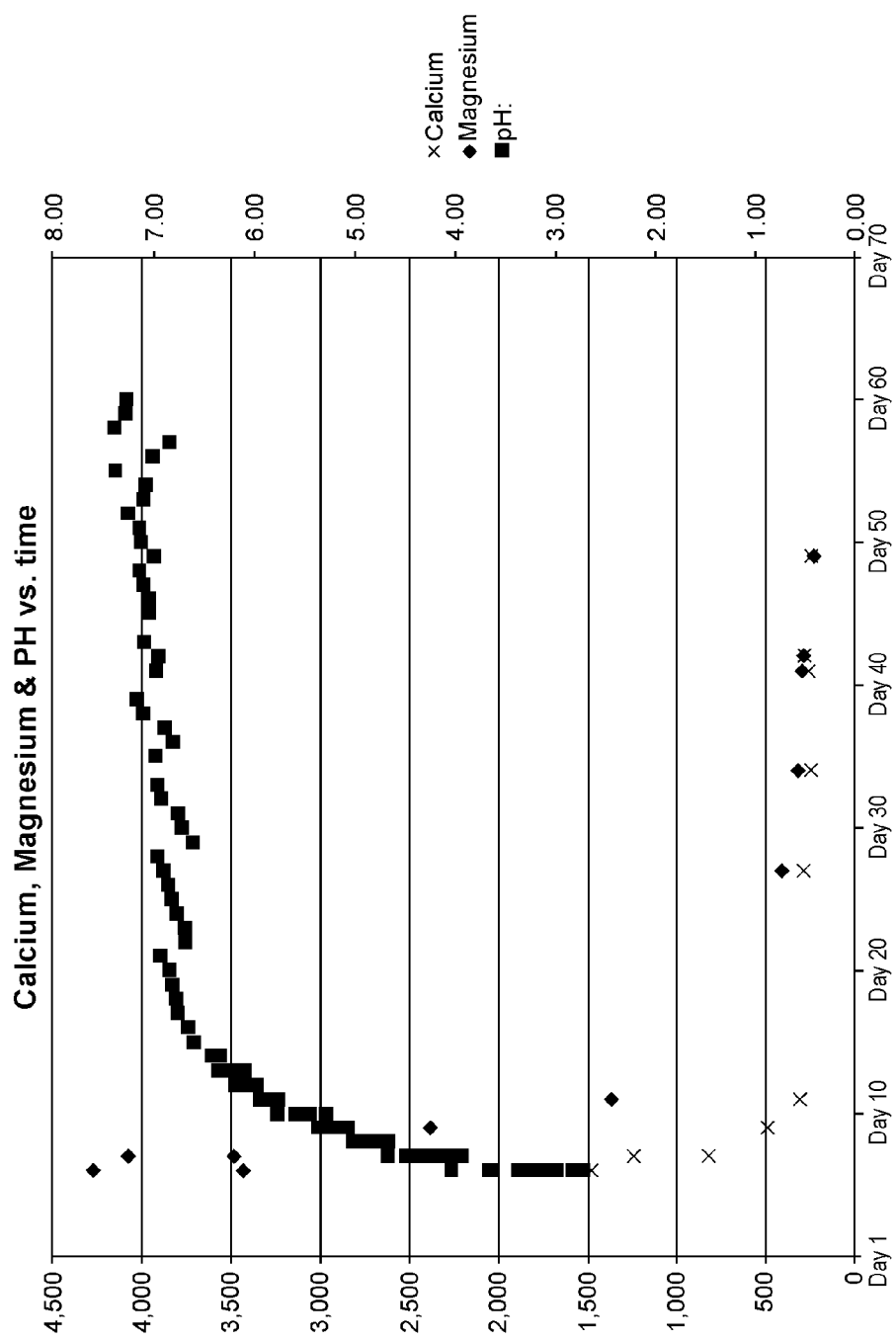
FIG. 3 illustrates a plot of calcium, magnesium and pH vs. time in samples taken from a horizontal well completed in the Woodford Shale formation from the same experiment as FIG. 2.
Figure 4:
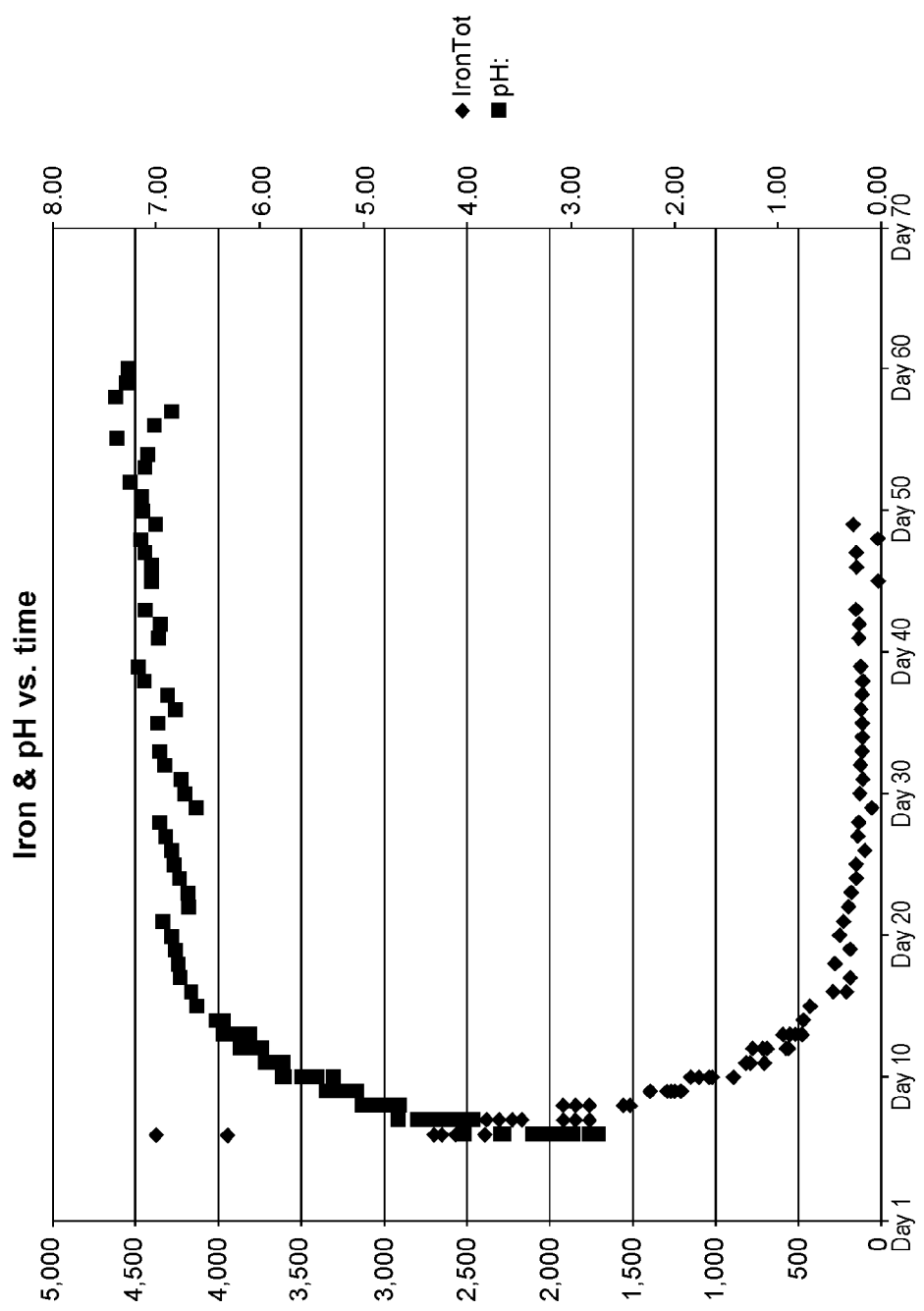
FIG. 4 illustrates a plot of iron and pH vs. time in samples taken from a horizontal well completed in the Woodford Shale formation from the same experiment as FIG. 2.

FIGS. 2 through 4 illustrate some results obtained from the use of embodiments of the stimulation treatment mixtures described above.

FIG. 2 illustrates a plot of aluminum, barium, manganese, strontium, sulfate; and pH vs. time in samples taken from flowback out of a horizontal well completed in the Woodford Shale formation.

FIG. 3 illustrates a plot of calcium, magnesium and pH vs. time in samples taken from a horizontal well completed in the Woodford Shale formation from the same experiment as FIG. 2.

FIG. 4 illustrates a plot of iron and pH vs. time in samples taken from a horizontal well completed in the Woodford Shale formation.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussions regarding ranges and numerical data. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5; etc. This same principle applies to ranges reciting only one numerical value. Furthermore, such an interpretation should apply regardless of the breadth of the range or the characteristics being described.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure.

What is claimed is:

1. A method for stimulating an existing well in a nano-darcy shale formation comprising:
providing a treatment mixture containing between about 0.1% and 95% by weight metal complexing agent at a pH of between about 0 and 10;
injecting the treatment mixture into the well at a pressure less than a fracture pressure of the nano-darcy shale formation until at least some of the treatment mixture exits the well and contacts the nano-darcy shale formation;

maintaining the treatment mixture in contact with the nano-darcy shale formation for a contact time of between about 1 minute to 100 days, thereby allowing the metal complexing agent to bind with at least some naturally-occurring metals contained within the nano-darcy shale formation; and removing the treatment mixture from the well after the contact time, thereby removing the bound naturally-occurring metals from the non-darcy shale formation and thereby improving the hydrocarbon production of the well relative to the hydrocarbon production immediately prior to performance of the method.

2. The method of claim 1 wherein the metal complexing agent is citric acid.

3. The method of claim 1 wherein the metal complexing agent is ethylenediaminetetraacetic acid (EDTA).

4. The method of claim 1 wherein the metal complexing agent is acetic acid.

5. The method of claim 1 wherein the metal complexing agent includes at least one of ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, oxalic acid, malonic acid, succinic acid, glutaric acid, adipic acid, pimelic acid, suberic acid, azelaic acid, sebacic acid, phthalic acid, terephthalic acid, aconitic acid, carballylic acid, trimesic acid, isocitric acid, citric acid, or any salt or derivative of any of the previously listed compounds.

6. The method of claim 1 wherein the treatment mixture comprises:
between about 0.1% and 95% by weight metal complexing agent;
between 1 and 10,000 parts per million (ppm) of a corrosion inhibitor;
between 1 and 10,000 ppm of a biocide;
between 1 and 10,000 ppm of a colloidal silica deposition inhibitor;
between 1 and 500 gallons per thousand gallons (gpt) of a mutual solvent; and
between 1 and 2000 parts per million of a surfactant.

7. The method of claim 1 wherein the treatment mixture further comprises between 0.1 and 95% of acid(s) as pH modifier.

8. The method of claim 1 wherein the injecting operation further comprises:
alternately injecting a first amount of treatment mixture and a second amount of a diverting mixture into the well.

9. The method of claim 1 wherein the injecting operation further comprises:
injecting the treatment mixture until the pressure within the well reaches a predetermined target pressure calculated based on the fracture pressure of the nano-darcy shale formation; and
upon reaching the target pressure, shutting in the well.

10. The method of claim 1, further comprising:
injecting the treatment mixture containing a metal complexing agent in combination with hydraulic fracturing and injecting into the formation in conjunction with propagation of induced fractures, the metal complexing agent including citric acid or EDTA.

11. The method of claim 1 further comprising:
monitoring at least one of pH and well pressure during the maintaining operation; and
initiating the removing operation based on results of the monitoring operation.

12. The method of claim 1 further wherein the metal complexing agent is selected from glutamic acid diacetic acid (GLDA), methylglycine diacetic acid (MGDA), β-alanine diacetic acid (β-ADA), ethylenediaminedisuccinic acid, S,S-ethylenediamindi succinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

13. The method of claim 1 further wherein the metal complexing agent is selected from acetic acid, acrylates, dihydroxymaleic acid, salts of dihydroxymaleic acid, EDTA (ethylenediamine tetraacetic acid), salts of EDTA, erythorbic acid, erythroboric acid, formic acid, gluconodeltalactone, GLDA (glutamic acid N,N-diacetic acid), salts of GLDA, HEDTA (hydroxyethylenediamine triacetic acid), salts of HEDTA, HEIDA (disodium ethanoldiglycine), salts of HEIDA, MGDA (methylglycine N,N-diacetic acid), salts of MGDA, NTA (nitriolotriacetic acid), organic metal complexers, ligands, porphyrins, pigments, peptides, saccharides, nucleic acids, phosphonic acid, polyacrylic acid and citric acid in an amount sufficient to sequester at least a portion of a metal compound.

* * * * *